United States Patent Office 3,792,127
Patented Feb. 12, 1974

3,792,127
HYDROGENATED BLOCK COPOLYMERS AND
PROCESS FOR PREPARING SAME
George A. Gillies, Berkeley, Calif., assignor to Shell Oil
Company, New York, N.Y.
No Drawing. Filed Sept. 22, 1971, Ser. No. 182,867
Int. Cl. C08f *19/08, 27/24*
U.S. Cl. 260—880 B                                    8 Claims

ABSTRACT OF THE DISCLOSURE

Block polymers having substantially improved processability comprise polymers having at least two polymer blocks A, at least one polymer block B and at least one polymer block C, blocks A being independently selected polymer blocks of at least one monoalkenyl arene, block B is a polymer block of at least one conjugated diene and block C comprises a random copolymer block of a conjugated diene and a monoalkenyl arene. Blocks A comprise at least 25% by weight of the total arene units of the block copolymer, block B comprises at least 25% by weight of the total diene units, and block C contains between 4 and 75% by weight of the total diene units and between 4 and 75% of the total arene units. Hydrogenated derivatives of these block copolymers also are contemplated.

BACKGROUND OF THE INVENTION

Block copolymers have been investigated in great diversity in recent years for use as synthetic elastomers or as thermoplastic polymers. Primarily, the most promising block polymers are those having polymer blocks of conjugated dienes and monoalkenyl arenes within certain known limitations. The proportions of the individual polymer blocks may be adjusted to give either an elastomeric or a thermoplastic polymer. Also within known limitations, elastomeric polymers may be produced which are referred to as "thermoplastic elastomers." By this is meant a polymer having the general stress-strain characteristics of a vulcanized elastomer without having been subjected to the usual vulcanization procedures. Hydrogenated derivatives of these block copolymers also are known wherein hydrogenation may be either random, selective or complete.

As the monovinyl arene block polymer content increases especially beyond about 45% of the total block polymer weight (and especially when such polymers are hydrogenated), it has been found that processing becomes increasingly difficult. Means have been investigated for alleviating this such as by reducing the total molecular weight of the block polymer or by blending processing aids or other polymers with the block polymer. Neither of these alternatives has resulted in a completely satisfactory product and means are being sought for the production of block polymers having improved processability while at the same time maintaining the other desirable physical properties of such products.

It is an object of the present invention to improve block copolymer processability. It is a further object of the invention to provide new types of block copolymers having improved processability. It is a specific object of the invention to provide normally thermoplastic block copolymers which are hydrogenated and at the same time possess satisfactory processing characteristics. Further objects will become apparent during the following detailed description of the invention.

Now, in accordance with the present invention, new block polymers are provided having substantially improved processing characteristics. These comprise block copolymers having three different types of polymer blocks A, B and C. The block copolymers have at least two polymer blocks A, at least one polymer block B and at least one polymer block C. Blocks A comprise independently selected polymer blocks of at least one monoalkenyl arene, at least 85% by weight of the blocks A being monoalkenyl arene condensed units. Block B comprises a conjugated diene polymer blocks having at least 85% by weight condensed diene units. Block C is a random copolymer block of conjugated diene and the monoalkenyl arene units present in the entire block copolymer. Hydrogenated derivatives of these block copolymers also are especially contemplated.

The presence of the random copolymer block appears to be the key essential to improve processability. This is especially noteworthy in the type of block copolymers having the general characteristics of a thermoplastic polymer and are even more noteworthy in the hydrogenated variety of the present invention. The blocks C may be characterized as having a random distribution of the diene and monovinyl arene units, although this distribution may occur as a "tapered" structure. By this is meant a random copolymer block in which the ratio of the two types of copolymerizable units may change progressively throughout the block from one end to the other although this is not an essential feature of the invention. It is necessary to restrict the proportion of the random copolymer blocks C as recited below since, if a smaller proportion is employed, then the effect upon processability is minimal. On the other hand, if an excessive proportion of the random copolymer block is present then other physical properties of the resulting block copolymer deteriorate. Consequently, it is preferred that the random copolymer blocks C comprise between about 5% and 25% by weight of the total block copolymer although the generic concept includes block copolymers C which comprise 4–75% by weight of the total block copolymer. The blocks B comprise polymers of such conjugated dienes as butadiene or isoprene. While the microstructure of these blocks may vary, it is especially preferred that they have between 7.5 and 40% 1,2-structure, preferably between 9 and 35%. The blocks A comprise predominantly monoalkenyl arene units. By this is meant monovinyl arenes such as styrene or ring alkylated styrenes as well as styrenes which have been substituted in the alpha position such as alpha methyl styrene. While the proportion of these blocks A may vary widely as long as the proportion of blocks C is maintained as described above, the invention is especially directed to those in which the polymer blocks A comprise between about 35% and 65% by weight of the total block polymer.

The precise structures of these block copolymers may be selected for a particular purpose. They may be generally characterized as either linear or branched and both types are contemplated with respect to the present invention. Again, while the average molecular weights may vary within broad limits, it is preferred that the polymer blocks A each have average molecular weights between about 4,500 and 20,000. Polymer blocks B each have an average molecular weight between about 20,000 and 50,000 while blocks C have average molecular weights between 2,000 and 10,000. These number average molecular weights are determined by tritium counting methods.

Preferred polymer structures may be represented as follows:

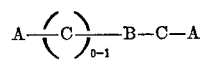

In the above general formula it will be noted that the polymer blocks A are terminal and that polymer block B is the elastomeric central block. The random copolymer block C lies between polymer block B and either one or both of the terminal blocks A.

It has been found that butadiene is an especially effective monomer for the preparation of the subject block copolymers and that styrene is the preferred alkenyl arene. Thus a preferred block copolymer having the above linear structure and having been subjected to hydrogenation is one prior to hydrogenation in which block B is a polybutadiene block preferably having between 9 and 35% 1,2-structure; block C is a random copolymer block of butadiene and styrene containing between 5 and 75% (preferably 5–20%) of the butadiene and styrene content in the total block copolymer. In this preferred species the blocks A are polystyrene blocks and comprise between 40 and 60% by weight of the total product.

A number of methods may be employed for the production of the block copolymers of the present invention. For example, a suitable process comprises the following steps:

(a) polymerizing a monoalkenyl arene to form a first alkenyl arene polymer block A, utilizing a monofunctional lithium initiator;
(b) block polymerizing therewith a conjugated diene to form a diene polymer block B. At this stage the intermediate has the general structure A—B·Li
(c) block polymerizing therewith a mixture of a conjugated diene and a monovinyl arene to form a random copolymer block C, thus creating the second intermediate structure A—B—C·Li, and
(d) block polymerizing therewith the same or a different monoalkenyl arene to form a second alkenyl arene polymer block. This gives a structure represented as follows: A—B—C—A.

An alternative process to that just described comprises the first three steps (a), (b), and (c), after which the second intermediate polymer is coupled by the use of known coupling agents which may be at least bifunctional and preferably have a functionality between 2 and 4. This results in the formation of either linear or branched coupled products. In these cases the random copolymer block C is the central block in a coupled product obtained by the use of a bifunctional coupling agent. Coupling also may be carried out after step (d) to obtain suitable coupled block copolymers. Coupling agents useful for this purpose include especially dihaloalkanes, dihaloalkenes or polyfunctional coupling agents of which silicon tetrachloride or diesters of monohydric alcohols are preferred. Suitable species of these coupling agents include especially dibromo ethane, silicon tetrachloride and diethyl adipate.

A third process involves the same steps as described in the first process outlined above but wherein the second and third steps are reversed. The final product, however, is essentially that obtained by the first described process.

Finally, another coupling process is contemplated in which the last described process is employed through steps a, b and c after which coupling is employed to produce a coupled product.

In all of the above described processes the use of alkyl lithium initiators such as, $C_2$–$C_8$ alkyl lithium is especially contemplated. Moreover, in all of the above processes the random copolymer blocks C may be prepared by two alternative means. First, as in the first described process the polymerization may be through step (b) up to such a point that a predetermined amount of diene monomer remains in the reaction mixture in an unpolymerized state. At this point a sufficient amount of monovinyl arene is injected into the system that the desired random or tapered copolymer block C results upon continuing polymerization. On the other hand, the process may be adjusted so that each polymer block is completed with all of the polymerizable monomer consumed thereby, after which in forming the random copolymer block C the two copolymerizable monomers are injected in their desired proportions.

It is also contemplated that multifunctional lithium initiators may be employed in the production of the subject block copolymers. For example, a dilithio initiator such as dilithio stilbene may be employed using the following series of steps: A conjugated diene such as butadiene is injected into the reactor in the presence of the dilithio initiator and polymerization is effected to obtain the first intermediate polymer block having the following structure Li·B·Li. Thereafter, a mixture of conjugated diene and monoalkenyl arene are randomly copolymerized in the same reactor thus resulting in a second intermediate block copolymer which may be represented as follows:

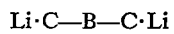

Finally, when the mixture has all been polymerized the monoalkenyl arene is injected to result in block polymerization thus giving the desired block copolymer as follows:

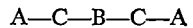

The conditions already known for block polymerization will be adhered to such as in the use of relatively inert solvents, e.g., cyclohexane, alkenes or alkanes such as isopentene or isopentane. Structure modifiers such as ethers, e.g., diethyl ether or tetrahydrofuran may be employed. The presence of polar compounds such as alcohols or olefins are excluded up to the point where the final polymer is to be terminated. At this point a terminating agent such as alcohol may be injected for the purpose of reacting with any lithium ions which may be present.

The products of this invention may be hydrogenated by means known in the art for this purpose. Especially favored hydrogenation catalysts comprise the reaction productions of aluminum alkyl compounds with either nickel or cobalt carboxylates or alkoxides. The products may be hydrogenated completely to remove both aliphatic or aromatic unsaturation or may be partially hydrogenated either selectively or randomly. In selective hydrogenation the products which result are those in which at least about 90% of the olefinic unsaturation is reduced while no more than about 10% of the aromatic unsaturation is reduced. The following working examples illustrate typical preparations of polymers within this invention and the properties of the same.

EXAMPLE I

Preparation of a typical block copolymer of this invention

A block copolymer of butadiene and styrene was prepared as follows:

Styrene (720 g.) was dissolved in cyclohexane (2728 g.) and was all polymerized by the use of sec.-butyl lithium initiator (5.5 g.) for 40 minutes at 50° C. to form a first polystyrene block. Thereafter, butadiene (2130 g.) dissolved in 6390 g. cyclohexane was injected and block polymerized for 150 minutes at 40° C. until 94% of the butadiene had polymerized. At this time, styrene (700 g.) dissolved in 2350 g. cyclohexane was injected and polymerization continued. The remaining butadiene copolymerized with some of the introduced styrene, thus forming a random (tapered) styrene/butadiene copolymer block. After butadiene was exhausted in this manner, the remaining styrene was block polymerized with the previously prepared intermediate block polymer to form a second homopolystyrene block. The reaction was "killed" by the addition of alcohol (180 cc.).

The product had the structure: polystyrene-polybutadiene-butadiene/styrene copolymer-polystyrene, the block molecular weights (determined by tritium counting methods) being 9,200–26,000–3,500–8,800. The butadiene block had a 1,2-content of 10%.

Hydrogenation procedure

Catalyst was made by mixing 1200 cc. cyclohexene, 42 cc. of nickel acetyl acetonate and 45 cc. aluminum triethyl. The catalyst was added to reactor. Hydrogen was added slowly to control exotherm to keep temperature at 40–50° C. but with maximum hydrogen pressure of 700 p.s.i.g. When aliphatic unsaturation has disappeared (by IR) (1 hr.) the temperature is raised to 200° C. and pressured to 1,100 p.s.i.g. hydrogen for three hours to hydrogenate the arene units.

EXAMPLE II

A second polymer was prepared, using the same monomers and process as described in Example 1, with the exception that the monomer proportions and initiator concentration were varied sufficiently to give a block copolymer in which the block molecular weights were 11,900–18,900–4,100–10,200. The block copolymer was completely hydrogenated as described in Example I.

The physical properties of compression moldings made from the hydrogenated polymers prepared according to Examples I and II are given in Table I below. For comparison, a polymer having essentially the same block molecular weights and made of the same monomers but not having a random copolymer block is included. This comparative polymer had the structure prior to hydrogenation of polystyrene-polybutadiene-polystyrene with block molecular weights of 10,000–30,000–10,000.

TABLE I.—PHYSICAL PROPERTIES

|  | Comparative polymer | Polymer of— | |
|---|---|---|---|
|  |  | I | II |
| Total molecular weight | 50 | 47 | 45 |
| Percent weight polyvinyl cyclohexane | 40 | 42 | 54 |
| Tensile strength, p.s.i.: |  |  |  |
| At yield | 3,000 | 2,650 | 3,190 |
| At break | 6,000 | 5,000 | 3,020 |
| Elongation, percent: |  |  |  |
| At yield | 5 | 6 | 5 |
| At break | 220 | 340 | 30 |
| Initial modulus×10⁻⁵ p.s.i. | 1.1 | 1.0 | 1.3 |
| Specific gravity | 0.92 | 0.92 | 0.93 |
| Rockwell hardness R | 84 | 76 | 85 |
| Izod impact, ft.-lb./in. notch [1] | 7.2H | 11.5H | 4.7H |
| Heat distortion temp., °F.: |  |  |  |
| 66 p.s.i. | 187 | 154 | 164 |
| 264 p.s.i. | 135 | 137 | 136 |
| Viscosity, $\eta_a$ at 200 sec.⁻¹×10⁻⁴ | 3.3 | 2.5 | 2.4 |

[1] H=hinged.

Table II presents the extrusion conditions. Data for the comparative polymer referred to above are included.

TABLE II.—EXTRUSION CONDITIONS[1] AND QUALITY OF EXTRUDATES

|  | Comparative polymer | Polymer of— | |
|---|---|---|---|
|  |  | I | II |
| Screw: |  |  |  |
| Compression ratio | 3 | 3 | 3 |
| R.p.m. | 123 | 128 | 125 |
| Extruder temp., °F.: |  |  |  |
| Barrel | 665 | 650 | 642 |
| Die | 655 | 650 | 652 |
| Melt pressure, p.s.i.g. | 4,300 | 3,300 | 1,000 |
| Take-up rolls: |  |  |  |
| Speed, f.p.m. | 30 | 25.5 | 39 |
| Temp., °F. | 61 | 61 | 61 |
| Throughput, lb./hr. | 13.5 | 12.2 | 19.4 |
| Transmittance,[2] percent | 56.9 | 82.0 | 82.3 |
| Visual evaluation | ([3]) | ([4]) | ([5]) |

[1] One-inch extruder with a single-stage screw (L/D 24) and a slit die (0.030 in. x 1.00 in.).
[2] Transmittance (percent) at 550 nm. normalized to 0.0217 inch thickness.
[3] Translucent and rough surface.
[4] Clear and smooth.
[5] Clear with longitudinal ridges.

I claim as my invention:

1. A substantially completely hydrogenated block copolymer having the general configuration prior to hydrogenation:

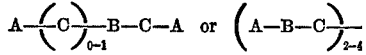

blocks A comprising alkenyl arene homopolymer blocks which comprise 35–65% by weight of the copolymer, each block A having an average molecular weight between 4,500 and 20,000, block B is a homopolymer block of a conjugated diene having an average molecular weight between 20,000 and 50,000 and block C is a random copolymer block of a conjugated diene and alkenyl arene having an average molecular weight between 2,000 and 10,000, block C comprising 4–25% by weight of the copolymer.

2. A block copolymer according to claim 1 wherein block B is a butadiene polymer block having between about 7.5 and about 40% 1,2-structure.

3. A block copolymer according to claim 1 wherein block C is a random copolymer block of butadiene and styrene, and comprises between about 5% and about 20% by weight of the block copolymer.

4. A block copolymer according to claim 1 wherein blocks A are styrene polymer blocks and comprise between about 35% and about 65% by weight of the block copolymer.

5. A block copolymer according to claim 1 having the general configuration

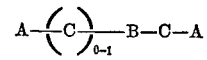

wherein each block A has an average molecular weight between about 4,500 and 20,000, block B has an average molecular weight between about 20,000 and 50,000, and each block C has an average molecular weight between about 2,000 and 10,000.

6. A hydrogenated block copolymer according to claim 5 wherein, prior to hydrogenation, blocks A are polystyrene blocks comprising between about 40 and about 60% by weight of the block copolymer, block B is a polybutadiene block having between about 9 and about 35% 1,2-structure, and block C is a random copolymer block of butadiene and styrene containing 5–20% of the total butadiene units and 5–20% of the total styrene units.

7. The process for the preparation of a block copolymer according to claim 1 which comprises:
   (a) polymerizing a monoalkenyl arene to form a first alkenyl arene polymer block A in the presence of a lithium alkyl initiator;
   (b) block polymerizing therewith a conjugated diene to form a diene polymer block B;
   (c) block polymerizing therewith a mixture of a conjugated diene and a monovinyl arene to form a random copolymer block C;
   (d) block polymerizing therewith a monoalkenyl arene to form a second alkenyl arene polymer block, whereby a block copolymer having the structure A—B—C—A is formed;
   (e) and substantially completely hydrogenating the block copolymer.

8. A process for the preparation of a block copolymer according to claim 1 which comprises:
   (a) polymerizing a monoalkenyl arene to form a first alkenyl arene polymer block A in the presence of a lithium alkyl initiator;
   (b) block polymerizing therewith a conjugated diene to form a diene polymer block B;
   (c) block polymerizing therewith a mixture of a conjugated diene and a monovinyl arene to form a random copolymer block C;
   (d) coupling the intermediate, whereby a block copolymer is formed;
   (e) and substantially completely hydrogenating the block copolymer.

References Cited

UNITED STATES PATENTS

| 3,251,905 | 5/1966 | Zelinski | 260—880 B |
| 3,265,765 | 8/1966 | Holden et al. | 260—880 B |
| 3,431,323 | 3/1969 | Jones | 260—880 B |
| 3,634,549 | 1/1972 | Shaw | 260—880 B |
| 3,670,054 | 6/1972 | De La Mare | 260—880 B |

JAMES A. SEIDLECK, Primary Examiner

U.S. Cl. X.R.

260—879